C. & J. P. KLOSSNER.
BAKING UTENSIL.
APPLICATION FILED FEB. 6, 1911.
1,017,561.
Patented Feb. 13, 1912.
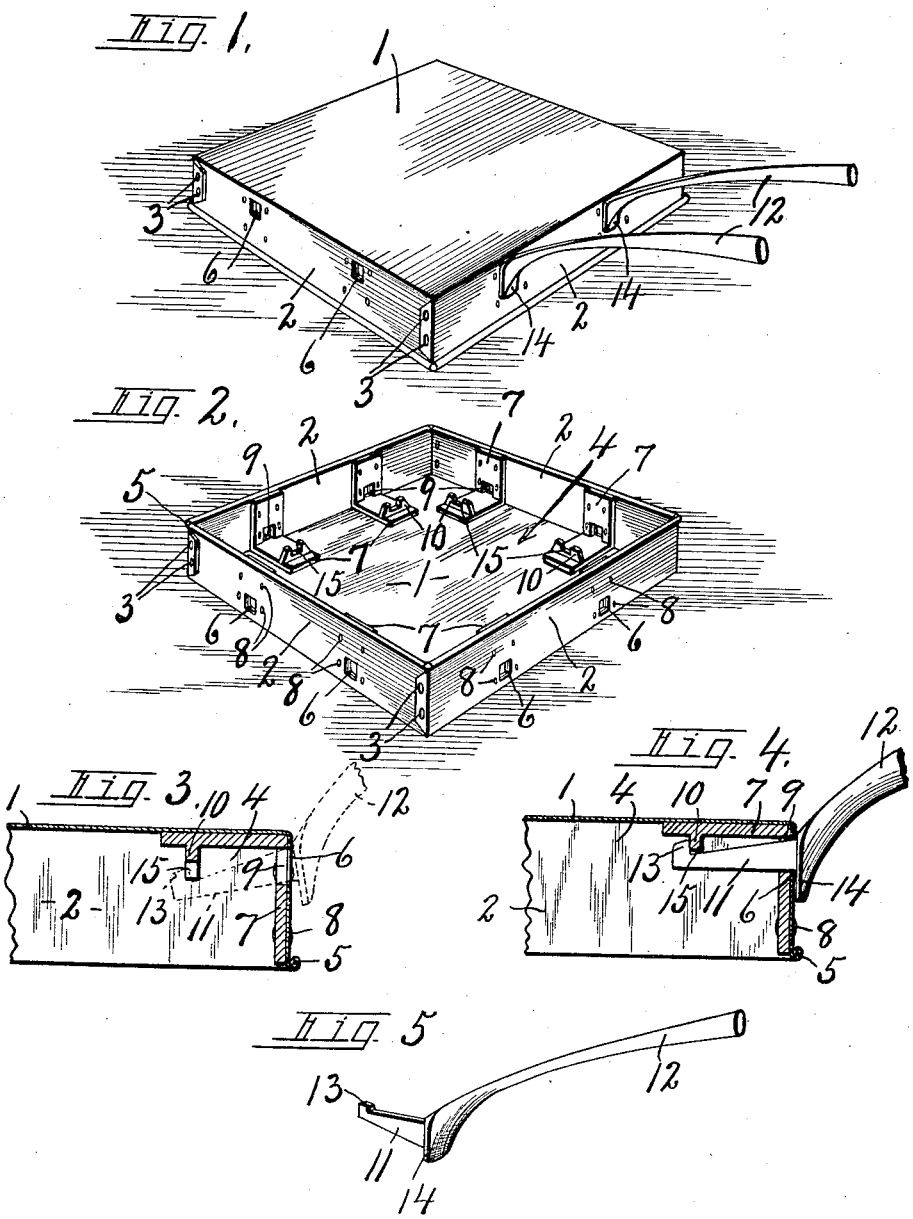
WITNESSES.
INVENTORS
C. Klossner and
J. P. Klossner
By Howard P. Davison
ATTORNEY.

UNITED STATES PATENT OFFICE.

CHARLES KLOSSNER AND JOHN P. KLOSSNER, OF WESTERNVILLE, NEW YORK.

BAKING UTENSIL.

1,017,561.   Specification of Letters Patent.   Patented Feb. 13, 1912.

Application filed February 6, 1911. Serial No. 606,839.

*To all whom it may concern:*

Be it known that we, CHARLES KLOSSNER and JOHN P. KLOSSNER, of Westernville, in the county of Oneida, in the State of New York, have invented new and useful Improvements in Baking Utensils, of which the following, taken in connection with the accompanying drawings, is a full, clear, and exact description.

This invention relates to certain improvements in baking utensils adapted to be inserted into and withdrawn from an oven and is specifically adapted for baking cookies and similar pastry articles made from dough or batter. It is found that this class of pastry bakes more speedily and uniformly when placed upon a substantially flat and smooth plate having flanges of uniform depth running entirely around its marginal edge to form a closed chamber directly beneath the plate which when the dough or batter is placed thereon, is inserted into an oven with the flanges resting upon the bottom or shelf of the oven so as to hold the plate some distance therefrom in such manner as to allow free circulation of the air entirely around the plate, the flanges serving to confine and direct the concentrated heat against the underside of the plate, thereby imparting its heat to the dough or batter to quickly and effectively bake the same to the desired condition.

The main object is to provide a comparatively light baking utensil of the character described with a smooth flat upper surface and marginal flange depending therefrom for forming a chamber underlying the plate.

A further object is to provide means for conveniently handling and manipulating the utensil with the dough or batter thereon in placing it into and removing it from the oven and turning the same from time to time during the baking operation.

Other objects and uses will be brought out in the following description.

In the drawings—Figure 1 is a perspective view of a baking utensil embodying the various features of our invention showing the manipulating handles in operative position. Fig. 2 is an inverted perspective view of the same utensil omitting the handles. Figs. 3 and 4 are enlarged sectional views of a portion of one side of the same utensil through the handle receiving openings, a portion of the handle being shown in operative position in Fig. 4, while in Fig. 3 the same portion of the handle is shown by dotted lines in its initial position for insertion or removal. Fig. 5 is a perspective view of one of the detached handles.

This utensil preferably consists of a flat rectangular plate —1— of comparatively thin sheet metal having its four sides or edges provided with down turned flanges —2— all of substantially the same depth with their lower edges in the same plane parallel with the plate —1— and secured together at the corners by any suitable fastening means as rivets —3—. The plate —1— and its flanges —2— are preferably made of a single piece of sheet metal having its edges bent at substantially right angles to the main body or plate —1— to form an inverted box-like structure having an interior chamber —4— of substantially the same area as the top or plate —1—, the ends of two opposite sides being preferably bent inwardly to lap upon the adjacent end of the remaining sides and firmly secured in place by the rivets —3—. The lower longitudinal edges of these flanges —2— are preferably rolled over and inwardly, forming loops in which are inserted reinforcing wires —5— to stiffen the flanges against bending. Each side or flange —2— is provided with a pair of openings —6— spaced some distance apart from each other and uniform distances from the ends and preferably close to or just under the plate —1—. The portions of the flanges —2— having the openings —6— are reinforced by cast metal brackets —7— preferably angular in cross section and secured by suitable fastening means as rivets —8— to the inner sides of said flanges as best seen in Figs. 2, 3 and 4, the horizontal portions of the brackets extending inwardly some distance beyond the sides and in close contact with but unattached to the inner face of the top plate —1—, thereby stiffening in a measure the top against sagging or buckling. These brackets are also provided with openings —9— of substantially the same size as and registering with the corresponding openings —6— and the upper horizontal portions thereof are provided with downwardly projecting lugs or shoulders —10— some distance inwardly from the vertical portions of the brackets and adjacent flanges —2—. The openings —6— and —9— are relatively small and preferably rectangular or square for receiving a locking shank —11— of a suitable handle —12—. The shank —11— is preferably elongated and tapered from the handle —12— and terminates at its inner end in a lateral offset or shoulder —13— for interlocking engagement with the shoulder —10— as clearly shown in Fig. 4. The handle —12— is provided at its junction with the shank —11— with a downwardly and laterally projecting flange —14— forming a stop engaging the outer surface of the adjacent portion of the flange —2— to limit the inward movement of the shank —11— when the handle is placed in operative position with the shoulder —13— in operative engagement with the inner face of the shoulder —10—.

We preferably provide each side of the tray with a pair of openings —6— to receive a corresponding pair of handles —12— by which the device with the unbaked or baked articles thereon may be more easily placed into and removed from the oven or manipulated while in the oven without liability of injury to the operator by coming in contact with any of the heated portions of the oven or utensil. Each shoulder —10— is preferably provided in its underside with a recess —15— of substantially the same width as the adjacent portion of the shank —11— which it is adapted to receive, thereby holding said shank and handle against undue lateral movement when engaged with the shoulder —10—. It will be observed that the shoulders —13— of the handles engage the inner faces of the shoulders 10 while the bearings —14— on the handles engage the outer faces of the tray, thereby interposing a portion of the tray between the shoulders —13— and —14— and preventing relative endwise movement of either the tray or handle when the latter are placed in operative position for lifting or carrying said tray.

In order to remove the handles, it is simply necessary to rest the tray upon a suitable support and then raise the outer ends of the handles sufficiently to disengage the shoulders —13— from the shoulders —10— whereupon the handles may be withdrawn through the openings —6— and —9—. For example, assuming that the dough or batter has been placed upon the upper surface of the tray or plate —1— ready to be inserted in the oven, the handles —12— are then engaged with the tray in the manner described, by passing the shanks —11— through the openings —6— and —9— and engaging the shoulders —13— with the shoulders —10— whereupon the entire tray with the dough or batter thereon may be lifted by means of the handles and placed in the oven so as to rest upon a suitable shelf provided therefor. The handles are then withdrawn in the manner described leaving the tray with the articles thereon in the oven which is then closed a sufficient time for the baking operation. When the pastry articles are properly baked, the handles may be again inserted in the tray and the latter lifted or withdrawn from the oven without liability of burning or otherwise injuring the operator by coming in contact with the heated metal of either the oven or tray.

What we claim is:

A baking utensil comprising a substantially flat plate having its marginal edges provided with depending flanges of substantially uniform depth, each flange having a pair of apertures, reinforcing brackets surrounding the apertures and secured to the flanges and also provided with openings registering with said apertures, shoulders on the brackets some distance inwardly from the flanges, and handles having portions thereof passed through the apertures and openings and provided with means engaged with said shoulders for holding the handle in operative position.

In witness whereof we have hereunto set our hands this 3rd day of February 1911.

CHARLES KLOSSNER.
JOHN P. KLOSSNER.

Witnesses:
WALTER T. CRILL,
THOS. MEREDITH.

---

Copies of this patent may be obtained for five cents each, by addressing the "Commissioner of Patents, Washington, D. C."